(12) United States Patent
Thrift et al.

(10) Patent No.: US 7,020,609 B2
(45) Date of Patent: Mar. 28, 2006

(54) VOICE ACTIVATED APPARATUS FOR ACCESSING INFORMATION ON THE WORLD WIDE WEB

(75) Inventors: Philip R. Thrift, Dallas, TX (US); Charles T. Hemphill, Redmond, WA (US)

(73) Assignee: Texas Instruments Incorporated, Dallas, TX (US)

( * ) Notice: Subject to any disclaimer, the term of this patent is extended or adjusted under 35 U.S.C. 154(b) by 410 days.

(21) Appl. No.: 09/811,231

(22) Filed: Mar. 16, 2001

(65) Prior Publication Data

US 2001/0034603 A1      Oct. 25, 2001

Related U.S. Application Data

(62) Division of application No. 08/419,229, filed on Apr. 10, 1995.

(51) Int. Cl.
    *G10L 21/00*    (2006.01)
(52) U.S. Cl. .............. 704/270.1; 704/231; 704/251; 704/257; 704/275
(58) Field of Classification Search ............... 704/275, 704/257, 235, 251, 270, 270.1, 231
    See application file for complete search history.

(56) References Cited

U.S. PATENT DOCUMENTS

| | | | |
|---|---|---|---|
| 5,204,947 A | 4/1993 | Bernstein et al. | 395/157 |
| 5,297,249 A | 3/1994 | Bernstein et al. | 395/156 |
| 5,317,647 A | 5/1994 | Pagallo | 382/14 |
| 5,333,237 A | 7/1994 | Stefanopoulos et al. | 395/12 |
| 5,355,472 A | 10/1994 | Lewis | 395/600 |
| 5,423,034 A | 6/1995 | Cohen-Levy et al. | 395/600 |
| 5,446,891 A | 8/1995 | Kaplan et al. | 395/600 |
| 5,479,601 A | 12/1995 | Matheny et al. | 395/155 |

(Continued)

OTHER PUBLICATIONS

Arons ("Hyperspeech: navigating in speech-only hypermedia", Proceedings of the third annual ACM conference on Hypertext, Dec. 15-18, 1991, pp. 133-146).*

(Continued)

*Primary Examiner*—Vijay Chawan
(74) *Attorney, Agent, or Firm*—Ronald O. Neerings; W. James Brady, III; Frederick J. Telecky, Jr.

(57) ABSTRACT

This is a voice activated Hypermedia system using grammatical metadata, the system comprising: a speech user agent; a browsing module; and an information resource. The system may include: embedded intelligence in hypermedia source; a means for processing the actions of a user based on the embedded intelligence; a means for returning a result of the actions to the user. In addition, the hypermedia source maybe a HTML page or an instructional module for communicating allowed actions by a user. The system may also include embedded intelligence as a grammar or reference to a grammar. The grammar may be dynamically added to a speech recognizer. In addition, the actions can come from a speech recognizer. Furthermore, the system may include voice activated hypermedia links and intelligent modules that process information from the information resources for allowing actions from the user. Other devices, systems and methods are also disclosed.

26 Claims, 1 Drawing Sheet

U.S. PATENT DOCUMENTS

| | | | |
|---|---|---|---|
| 5,493,677 A | | 2/1996 | Balogh et al. ............... 395/600 |
| 5,513,298 A | | 4/1996 | Stanford et al. ........... 395/2.52 |
| 5,526,407 A | | 6/1996 | Russell et al. ................ 379/89 |
| 5,526,520 A | | 6/1996 | Krause ....................... 395/600 |
| 5,572,625 A | | 11/1996 | Raman et al. ............. 395/2.69 |
| 5,774,628 A | * | 6/1998 | Hemphill .................... 704/255 |
| 5,774,859 A | * | 6/1998 | Houser et al. .............. 704/275 |
| 5,819,220 A | * | 10/1998 | Sarukkai et al. ............ 704/243 |
| 6,188,985 B1 | * | 2/2001 | Thrift et al. ................ 704/275 |

OTHER PUBLICATIONS

Hemphill et al., ("Surfing the Web by Voice", Electronic Proceedings, ACM Multimedia 95, Nov. 5-9, 1995).*

Newton's Telecom Dictionary, p. 179, 10th edition 1996, A flatiron Publishing, Inc. Book.*

"Metadata: a User's View", Scientific and Statistical Database, Francis P. Bretherton, et al., 1994 7$^{th}$ International Working Conference, Feb. 1994, pp. 166-174.

"Natural Language in Multimodal Human-Computer Interfaces", IEEE Expert Magazine, vol. 9, Issue 2, Apr. 1994, pp. 40-44.

"An Active Hypertext Model for System Requirements", Colin Potts, et al., Software Specification and Design, 1993, pp. 62-68.

"Augmenting a Window System with Speech Input", Computer Magazine, vol. 23, Issue 8, Aug. 1990, pp. 50-56.

"Computer Dictionary", Microsoft Press, Second Edition, 1993, p. 355.

"Hyperspeech: Navigating in Speech-only Hypermedia", Barry Arons, Hypertext '91, Third ACM Conference on Hypertext Proceedings, Dec. 15-18, 1991, pp. 133-146.

* cited by examiner

VOICE ACTIVATED APPARATUS FOR ACCESSING INFORMATION ON THE WORLD WIDE WEB

This application is a Divisional of application Ser. No. 08/419,229 filed Apr. 10, 1995.

CROSS-REFERENCE TO RELATED APPLICATIONS

The following coassigned patent applications are hereby incorporated herein by reference: U.S. Pat. Ser. No. 08/419,229 filing date Apr. 10, 1995 TI Case No. TI-20266

FIELD OF THE INVENTION

This invention generally relates to voice activated Hyper-Media Systems using grammatical metadata.

BACKGROUND OF THE INVENTION

Without limiting the scope of the invention, its background is described in connection with the World Wide Web pages on the Internet.

The Internet is the largest network of computer systems in the world. Technically, it's the global network that connects huge numbers of networks to one another. The Internet was initially implemented by the government as a network of military computers, defense contractors, and universities performing defense research. The original agency in charge of the Internet was the Advanced Research Procurement Agency (ARPA) and the network became known as the ARPANET. It mainly allowed sharing of information in the research being performed between the various sites, but also gave the government a means to research communication security and integrity in conditions like atomic attacks and associated electromagnetic effects. However, the Internet has evolved from a primarily defense oriented network, to a multipurpose network that connects almost every other kind of computer to the original ARPANET, and thus defining the Internet.

Currently, the Internet links together the massive online service bureaus, such as Compuserve, Prodigy, and America Online. It also links together hundreds of thousands of universities, government agencies, and corporations located in almost a hundred countries around the world. It reaches out to small offices, school rooms, and even individual homes. According to the Internet Society (ISOC), the net reached nearly five million host computers and twenty five million users in 1994. Those numbers have seen a steady doubling every year since 1983. However, many other sources doubt those numbers and state that nobody really knows how big the Internet is.

From the user's perspective, the Internet is a truly massive resource of services. This network gives you access to the world's largest online source of reference information, publicly distributed software, and discussion groups, covering virtually every topic one could reasonably imagine and an embarrassingly high number of topics that one could not. A subsection of the information contained by the computers on the Internet is called the World Wide Web (heretofore known as WWW or Web). The Web consists of s system of information sites that connect through a series of hyperlinks. Hyperlinks allow a user to either point and click at a highlighted hyperlink (a highlighted hyperlink could be either text or a graphic) or enter a number corresponding to the highlighted link. Activating the highlighted hyperlink will access either another site, an audio clip, a video clip, a graphic, text based information or other types multi-media information being developed everyday.

This almost unlimited amount of information is very hard to digest without some sort of organization. A common software tool to organize the vast amount of information is called a "browser". This common software tool utilizes a common programming language that define hyperlinks and the other information presented on the screen. The common programming language is called Hypertext Markup Language (HTML) (Hypertext is commonly referred to mean any hyperlink to multi-media information and will heretofore be interchangeable with hyperlink). There are several browsers being used for the World Wide Web. The National Center for Supercomputing Application (NCSA) has contributed to a browser called NCSA Mosaic and is probably the most widely used browser at the present time. Other browsers have been developed by software companies and/or online service providers (e.g. Netscape, America Online, . . . ).

SUMMARY OF THE INVENTION

As the popularity of the Web has skyrocketed over the past two years, so has the amount of information available. In addition, the nature of the users has shifted from scientists to the general public. At the same time, the power of workstations and PCs has increased to the point where they can support speaker independent, continuous speech recognition. The present invention describes a speech interface to the Web that allows easy access to information and a growth path toward intelligent user agents.

To allow anyone to walk up and use the system naturally without training, continuous, speaker independent speech recognition is used. Additionally, the recognizer uses phonetic models to allow recognition of any vocabulary word without training on that specific word. The ability to handle a flexible vocabulary, coupled with the ability to dynamically modify grammars in the recognizer, allows the invention to support grammars particular to a Web page. These features are utilized to support a Speakable Hotlist, speakable links, and smart pages in the speech user agent.

This is a technique for embedding voice activated control information in HTML pages as delivered on the World Wide Web. The voice control information is encoded in a grammar language and is interpreted by a Web client user-agent that translates user utterances into client actions. The user may also query the page about its functionality.

The invention includes a speaker independent, continuous, real-time, flexible vocabulary speech interface to the Web as an integral part of building an intelligent user agent. In addition to speakable control words (e.g., "scroll down", "back", etc.)., Internet browsers can be made speech aware in three distinct ways. First, the interface implements the idea of a Speakable Hotlist of Internet sites. Second, the interface includes Speakable Hyperlinks. This involves some lexical challenges (e.g., "DOW DOWN 1.68 AT 11") and on-the-fly pronunciation generation and dynamic grammar modification. Furthermore, Smart Pages have been implemented, making it possible to associate a grammar with any Web page. In this way, the interface knows the language for that page, recognizes sentences using that language, and passes the result back to the page for interpretation. To avoid coverage issues, each Smart Page can briefly describe the language to the user. With this approach, knowledge can be effectively distributed rather than attempt to construct an omniscient user agent.

This is a voice activated Hypermedia system using grammatical metadata, the system comprising: a speech user agent; a browsing module; and an information resource. The system may include: embedded intelligence in hypermedia source; a means for processing the actions of a user based on the embedded intelligence; a means for returning a result of the actions to the user. In addition, the hypermedia source maybe a HTML page or an instructional module for communicating allowed actions by a user. The system may also include embedded intelligence as a grammar or reference to a grammar. The grammar may be dynamically added to a speech recognizer. In addition, the actions can come from a speech recognizer. Furthermore, the system may include voice activated hypermedia links and intelligent modules that process information from the information resources for allowing actions from the user. Other devices, systems and methods are also disclosed.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
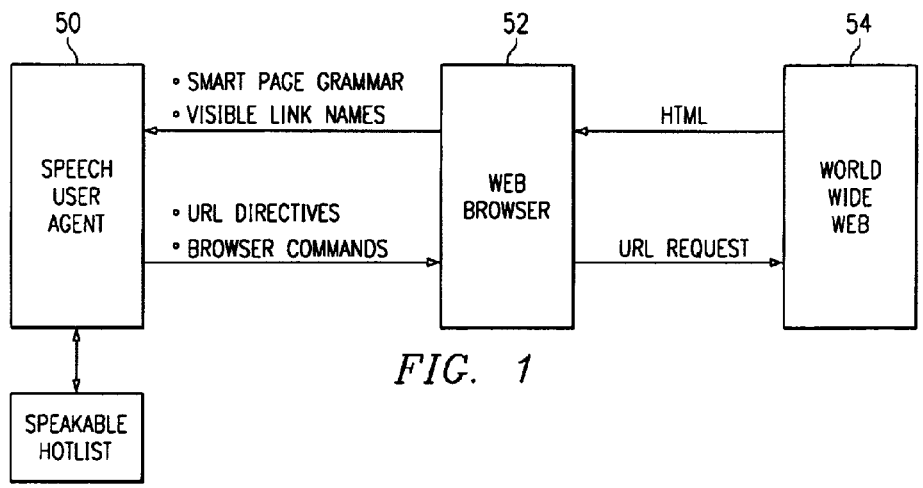
FIG. 1 is a diagram depicting the interaction between the speech user agent, the browser and the Web.

Most browsers offer the quite useful concept of a "hotlist" to store and retrieve interesting or frequently used Uniform Resource Locations (URLs). After a short time, however, the hotlist can grow to the point where desired information becomes difficult to find. Besides the sheer number of items to examine, names of hotlist entries which seem perfectly reasonable at the time do not seem to associate well with the corresponding page over days or weeks. To help alleviate these problems, a Speakable Hotlist was developed.

In a Speakable Hotlist, the user constructs a grammar and associates it with a URL. To create a grammar currently, the user edits an ASCII grammar file and types in the grammar using a BNF syntax where "|" denotes alternatives, square brackets denote optionality, and parentheses provide grouping. The following is an example implementation:

start(what_is_the_weather).

what_is_the_weather - - - >

(how is | how's) the weather [look | doing] [today] |

(how does | how's) the weather look [today] |

(what is | what's) the weather [today].

The user then associates the start symbol "what_is_the_weather" with the appropriate URL in a separate file. When the recognizer finds a string from one of the languages in the hotlist grammar file, it looks up the associated URL and directs the browser to fetch the page.

To speak the phrase "how does the weather look today" at a normal rate requires a little under 1.5 seconds and requires very little mental or physical effort. To achieve the same result without speech requires at best 10 seconds between four button pushes, scrolling, and scanning. The combined strengths of natural phrases and random access make the Speakable Hotlist very attractive.

The hotlist was modified by voice using two commands. Speaking the phrase "add this page to my hotlist" adds the title of the page as the default grammar and automatically associates that grammar with the current URL. Speaking the phrase "edit the Speakable Hotlist [for this page]" then allows the user to manually add more syntactic flexibility in retrieving the page by voice. The ability to dynamically add grammars to the recognizer is described later.

Once the user has arrived at a page via the Speakable Hotlist, it seems natural to speak the underlined link names (or text portion of the anchors). This involves the following steps: getting the link name/URL pairs from the page, identifying the tokens in the link names, producing the pronunciation grammars for the tokens, creating grammars for the link tokens, creating a grammar for all the links on the page, and adding the created grammars to the current set known by the recognizer. For most pages, this entire process takes between 0.2 and 0.5 seconds depending on the density of the links on the page. This small delay occurs while the user reads the page, deciding where to go next.

In order to extract the link name/URL pairs from a page, a small change is required in the browser. NCSA Mosaic parses the incoming HTML into an internal form so that we simply extract the objects of the appropriate type [reference from the URL of: <http://www.ncsa.uiuc.edu/SDG/Software/Mosaic/NCSAMosaicHome.html>]. However, a given HTML page can have arbitrary length so for the purposes of the preferred embodiment, the link name/URL pairs were limited to those visible on the screen. Therefore, directives such as "scroll down" also result in communicating the currently visible set of link name/URL pairs to the recognizer.

In addition, correct tokenization of the link names is quite challenging. Given that the user can visit any page in the world on any subject, the format of the link names varies wildly. In end of the spectrum consist of spelled words. The other end include E-mail addresses and pathnames. In between, link names can include:

numbers as in "DOW DOWN 1.68 AT 11" ("one point six eight" or "one point sixty eight"?), acronyms such as "CIA" in "PLOT TO BOMB CIA CENTER UNVEILED", invented words such as "DowVision", and novel use of punctuation, abbreviations, etc.

Given such a wide range of tokens and so many possible contexts, ambiguity should be allowed in the tokenization process. For example, "CIA" could be pronounced as the "C-I-A" or it could be pronounced as "see-ah" (the Spanish word for company).

Token pronunciations provide another challenge. Primary searching could be implemented on a name dictionary, an abbreviation/acronym dictionary, and a standard English pronunciation dictionary containing more than 250,000 entries. If all of these fail, letter to phoneme rules could be implemented. All pronunciations then undergo a transformation from phonemes to phones (e.g., the introduction of the "flap" or "D"-like sound in words such as "butter" for the American English dialect). The phone pronunciations undergo a further transformation to allophones (i.e., the different realizations of a given phone in the context of different neighbor phones, [Y. H. Kao, C. T. Hemphill, B. J. Wheatley, P. K. Rajasekaran, "Toward Vocabulary Independent Telephone Speech Recognition," Proceedings of ICASSP, 1994.]).

Once the grammar of tokens is created for a given link name, conversion to a form suitable for the recognizer is implemented. This includes minimizing the number of nonterminals (for efficiency), introducing an optional symbol to allow pauses between words, and segregating the grammar into different versions for males and females to connect (eventually) with the appropriate allophone (for accuracy).

Next, a single grammar containing references to all of the individual link grammars is formed. This simplifies the task of identifying when the user has uttered a link name and the corresponding lookup for the URL.

Finally, for all of the grammars formed, we add or replace each grammar in the current graph of regular grammars within the recognizer. This involves linking them together in a Directed Acyclic Graph (DAG) relationship and determining the maximum depth of each grammar in the DAG for processing purposes [Charles T. Hemphill and Joseph Picone, "Chart Parsing of Stochastic Spoken Language Models," Proceedings of the DARPA Speech and Natural Language Workshop, Philadelphia, Pa., February, 1989.]. In the preferred embodiment, the interface caches all link grammars and token pronunciation grammars. This simplifies the job of supporting speakable links, but may become an issue for a given interface used over an extensive period of time with many hundreds of pages. Machines with limited memory might necessitate incorporation of a grammar replacement strategy.

FIG. 1 depicts the relationship between the speech user agent 50, the Web browser 52, and the World Wide Web 54.

The Speakable Hotlist and speakable links capabilities go a long way toward making the Web browser speech aware, but they only make the existing capabilities of the browser easier to use. In addition to links, pages on the Web also contain forms and should also be addressed. To address this issue and a variety of others, the present invention includes Smart Pages.

A Smart Page is defined as a page that contains a reference to a grammar, as well as being able to interpret the result of recognition based on that grammar. The currently visible page defines a context and the Smart Page grammar admits sentences appropriate for that context. In addition, Smart Pages should briefly describe the language that the page understands and allow the user to look at the grammar, if desired, for full detail.

To create a Smart Page, the page author uses the same BNF syntax as described for the Speakable Hotlist. The grammars could take the form of a context-free grammar, but without embedded recursion. The following grammar represents a simple example from a weather Smart Page: (other rules expand the nonterminal symbols CITY and STATE)

start(weather_smart_page).
weather_smart_page - - - >
  [(how is | how's) the weather in] CITY_NAME [today] |
  [(how does | how's) (the weather | it) look in] CITY_NAME [today] |
  [(what's | what is | show [me]) the weather in] CITY_NAME [today] |
    [and] how about [the weather in] CITY_NAME |
  what cities do you (know about | have) [in STATE_NAME] |
  show me the Smart Page grammar.

In the preferred embodiment, a copy of NCSA Mosaic was modified to look for a special "LINK" relationship in the document "HEAD". If found, the interface retrieves the specified grammar given the URL, converts it to a speech ready form, creates pronunciation grammars as in the case of speakable links, and loads the grammars into the recognizer. An example of a grammar reference within a page follows:

<LINK REL="X-GRAMMAR" HREF="/speech/
      info/html/weather_smart_page.grm">

The interface sends sentences recognized from the Smart Page grammar as arguments back to the page (or a URL designated in the page by a LINK relationship). Any number of interpretation schemes such as shell scripts, lex/yacc, Definite Clause Grammars (DCG), or custom parsers can then produce the desired URL. Declarative approaches such as DCG allow one grammar to be written with combined syntax and semantics, automatically extract the BNF form of the Smart Page grammar, and interpret the results [B. Wheatley, J. Tadlock, and C. Hemphill, "Automatic Efficiency Improvements for Telecommunications Application Grammars," First IEEE Workshop on Interactive Voice Technology for Telecommunications Applications, Oct. 18–20, 1992, Piscataway, N.J., U.S.A.].

Figure 2:
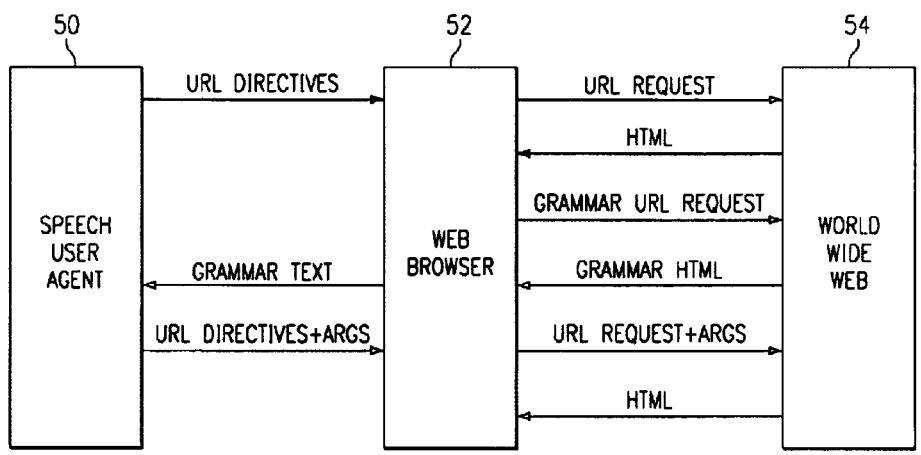
FIG. 2 is a diagram depicting the loading and use of a Smart Page.

FIG. 2 describes the mechanics of loading and using a Smart Page in detail. This diagram will be described with reference to a Smart Page version of the weather query. First, the user utters "how's the weather look today" from the Speakable Hotlist resulting in the Speech User Agent (SUA) 50 sending the URL directive:

<http://kiowa.csc.ti.com/cgi-bin/
      weatherpage#REPORT> to the Web Browser (WB) 52. The WB 52 then passes this to the World Wide Web (WWW) 54 to return HTML (the HTML then includes the normal weather map). The WB 52 observes the grammar LINK in the Smart Page and asks the WWW 54 for the Smart Page Grammar (SPG) using the supplied URL:

</speech/info/html/weather_smart_page.grm>.

The WWW 54 returns the SPG as HTML and the WB 52 then passes this back to the SUA 50. The SUA 50 dynamically adds the grammar to the recognizer as described above. After looking at the map and reading the instructions on the page, the user decides to utter "how about Chicago Illinois" to get more detail for that city. Recognizing that this string belongs to the Smart Page grammar, the SUA 50 then sends a directive with arguments:

<http://kiowa.csc.ti.com/cgi-bin/weatherpage?how+
      about+Chicago+Illinois> to the WB 52 which then passes it on to the WWW 54. The WWW 54 page at the weather site (cgi-bin in this case) notices the arguments and interprets them to produce the URL relocation:

<http://rs560.cl.msu.edu/weather/
      interactive.html?id=ord REPORT> where "ord" is an airport code for that city. The WWW 54 then passes back the HTML for the desired information to the WB 52. Based on the information displayed on the Smart Page, the user can then ask about the weather in other cities, ask about what cities it knows about (optionally in a particular state), or ask to see the Smart Page grammar.

As a policy decision, the grammar for a given Smart Page could remain active until the interface encounters a new Smart Page. In the example above, this allows the user to ask about the weather in several cities without having to retrieve a grammar for each of the associated pages.

Theoretically, there is no limit to the size of a given Smart Page grammar. Practically, however, the recognizer can begin to experience a decrease in speed and accuracy if the grammar grows beyond a moderate size. Further effort in this area will allow the user to use larger and larger Smart Page grammars and allow the apparent collective "intelligence" of the interface to increase.

An example implementation of a spoken language grammar is also provided. Using the HTML 2.0 LINK element, the spoken language grammar may be associated with an HTML document, file.html:

```
<HTML>
    <HEAD>
    [other HEAD elements omitted]
    <ISINDEX>
    <LINK REL="X-GRAMMAR" HREF="file.cfg">
    </HEAD>
    <BODY>
    ...
    </BODY>
</HTML>
``` where file.cfg is a grammar file associated with the BASE file.html. The file extension in this case is CFG (context free grammars). However, other grammar formats are possible.

The following is an example of a CFG file:

```
start("phone_list/1").
"phone_list/1" ---> "lookup/0", "name/1".
"phone_list/1" ---> "whatis/0", "name_pos/1", "phonenumber/0".
"phone_list/1" ---> "".
"lookup/0" ---> "lookup".
"whatis/0" ---> "whats".
"whatis/0" ---> "what", "is".
"phonenumber/0" ---> "phone", "number".
"phonenumber/0" ---> "number".
"name/1" ---> "charles/0", "Hemphill".
"name/1" ---> "philip/0", "Thrift".
"name/1" ---> "john/0", "Linn".
"name_pos/1" ---> "charles/0", "Hemphills".
"name_pos/1" ---> "philip/0", "Thrifts".
"name_pos/1" ---> "john/0", "Linns".
"charles/0" ---> "Charles".
"charles/0" ---> "Chuck".
"philip/0" ---> "Philip".
"philip/0" ---> "Phil".
"john/0" ---> "John".
```

A unique predicate should be included to designate the start symbol for the grammar.

The function of the grammar file is as follows. When the speech-capable client assesses the html file and detects an associated grammar file as indicated in the HEAD, the grammar file is also retrieved. The client uses the grammar to map user spoken utterances into query words. The query is then passed to the ISINDEX reference for server-side processing.

The invention implements a novel interface that lets the user surf the Web by voice in a variety of ways. These include simple command control of the browser, a voice controlled hotlist that allows for syntactic variation, voice control of the dynamically changing set of link names encountered, and voice queries in the context of Smart Pages. With the aid of the invention, surfing by voice will become commonplace after settling some relatively simple standards issues regarding how to communicate visible link name/URL pairs and retrieval of grammar links from a Smart Page. As the number of Smart Pages and the size of the Smart Page grammars grows, the Web should become more useful and easier to use.

In the preferred embodiment, it is assumed that speech comes in locally from a microphone, but it could just as well come from a telephone or any other audio source. In addition, speech processing takes place locally on the client machine. This simplifies processing of local requests such as "scroll down", etc. However, there is nothing intrinsic in the architecture that would prevent speech processing on a server. The description of the interface concentrates on speech input, but could also work with mouse and keyboard input.

A few preferred embodiments have been described in detail hereinabove. It is to be understood that the scope of the invention also comprehends embodiments different from those described, yet within the scope of the claims. For example, even though the preferred embodiment is described in relation to a voice activated Internet Browser, the voice activated system could be used with other systems (e.g. on-line documentation systems, databases, . . . ). Words of inclusion are to be interpreted as nonexhaustive in considering the scope of the invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An apparatus, comprising:
    a speech user agent that dynamically creates vocabulary, grammar and actions; and
    a browsing module for the world wide web being responsive to said speech user agent, said speech user agent facilitating voice activation of said browsing module to access an information resource on the world wide web.

2. The apparatus of claim 1, wherein said access of said information resource is accomplished in part through use of a grammar embedded in said information resource.

3. The apparatus of claim 2, wherein said information resource is an HTML page.

4. The apparatus of claim 2, wherein said embedded grammar is a smart page grammar.

5. The apparatus of claim 2, wherein said embedded grammar is a reference to a grammar located in said information resource.

6. The apparatus of claim 2, wherein said grammar is dynamically added to a speech recognizer.

7. The apparatus of claim 2, further including a means for processing the verbal directions of a user based on said grammar.

8. The apparatus of claim 7, wherein said actions come from a speech recognizer.

9. The apparatus of claim 7, further including a means for returning a result of said verbal directions to said user.

10. The apparatus of claim 1, further including an instructional module for communicating allowed actions by a user.

11. The apparatus of claim 1, further including a means for extracting a grammar from a hypermedia source on said information resource for future reference to said source.

12. The apparatus of claim 11, further including a means for automatically producing an intelligent grammar from said information resource.

13. The apparatus of claim 12, further including a means for processing said grammar to produce a reference to said hypermedia source.

14. The apparatus of claim 1, wherein said apparatus further includes a means for tokenizing a title for addition into said grammar.

15. The apparatus of claim 1, wherein said apparatus includes a means for dynamically adding said grammar to a speech recognizer.

16. An apparatus, comprising:
a speech user agent for accessing a browsing module for the world wide web, said speech user agent dynamically creates vocabulary, grammar and actions to enable said browsing module to access an information resource on the world wide web.

17. A method, comprising:
embedding voice activated control information in HTML pages as delivered on the World Wide Web, wherein said voice control information is encoded in a grammar language and is interpreted by a Web client user-agent that translates user utterances into client actions.

18. An apparatus, comprising:
a speech user agent that dynamically creates vocabulary and grammar; and
a browsing module for the world wide web being responsive to said speech user agent, said speech user agent facilitating voice activation of said browsing module to access an information resource on the world wide web.

19. An apparatus, comprising:
a speech user agent for accessing a browsing module for the world wide web, said speech user agent dynamically creates vocabulary and grammar to enable said browsing module to access an information resource on the world wide web.

20. An apparatus, comprising:
a speech user agent enabled to access a speakable Hotlist; and
a browsing module for the world wide web being responsive to said speech user agent, said speech user agent facilitating voice activation of said browsing module to access an information resource on the world wide web.

21. The apparatus of claim 20, wherein said speakable Hotlist comprises grammars associated with respective URLs.

22. The apparatus of claim 20, wherein said speakable Hotlist is modifiable by voice command.

23. The apparatus of claim 22, wherein the voice command is a phrase that adds a page to the Hotlist.

24. The apparatus of claim 23, wherein adding a page to the Hotlist comprises adding the title of the page as a default grammar and associating that grammar with a current URL.

25. A method of extracting link names from a page of a speakable Hotlist, comprising the steps of:
speaking a link name;
retrieving the link name from the page;
identifying token(s) in the link name;
creating pronunciation grammar(s) for the token(s);
creating grammars for the link token(s);
creating a grammar for all the links on the page; and
adding the created grammars to the current set known by a speech recognizer.

26. The method of claim 25, wherein said link name is a link name/URL pair.

* * * * *